H. MARKHAM.
Bee Hive.
No. 41,711.  Patented Feb. 23, 1864.
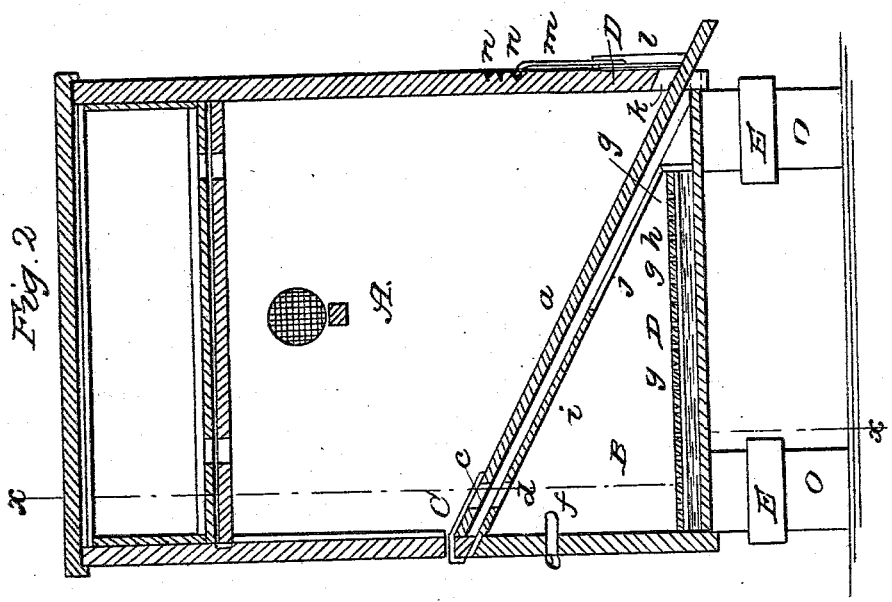
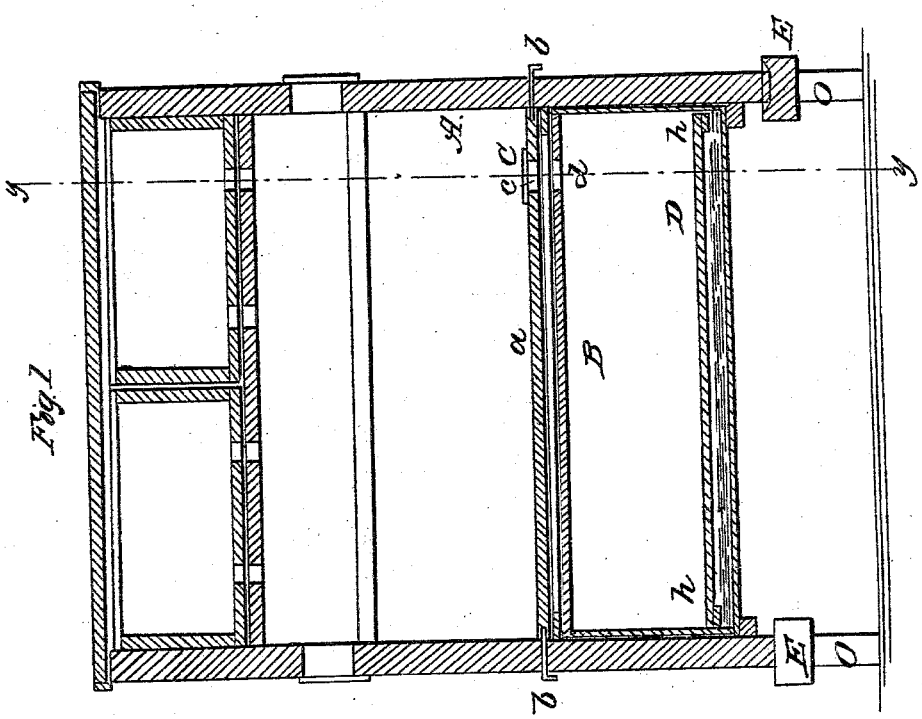

UNITED STATES PATENT OFFICE.

HORACE MARKHAM, OF HENDERSON, ILLINOIS.

IMPROVEMENT IN BEE-HIVES.

Specification forming part of Letters Patent No. 41,711, dated February 23, 1864.

*To all whom it may concern:*

Be it known that I, HORACE MARKHAM, of Henderson, in the county of Knox and State of Illinois, have invented a new and Improved Bee-Hive; and I do hereby declare that the following is a full, clear, and exact description of the same, reference being had to the accompanying drawings, making a part of this specification, in which—

Figure 1 is a vertical section of my invention, taken in the line $x\ x$, Fig. 2; Fig. 2, a vertical section of the same, taken in the line $y\ y$, Fig. 1.

Similar letters of reference indicate corresponding parts in the two figures.

The invention relates to an improvement in a slide applied to the bee-entrance and arranged in such a manner that the bee-entrance may be increased or diminished in area as circumstances may require.

To enable those skilled in the art to fully understand and construct my invention, I will proceed to describe it.

A represents the hive, which may be of quadrilateral form, and is provided with an inclined bottom, $a$, which is secured in position by pins $b\ b$, passing through the sides of the hive, as shown in Fig. 1.

B represents a feed-chamber, the top of which is inclined corresponding to the inclination of the bottom $a$, as shown clearly in Fig. 2. This feed-chamber is fitted underneath the bottom $a$ of the hive, and it has an opening, $d$, made in its top, which, when the feed-chamber is adjusted in its proper place underneath the bottom $a$, registers or coincides with a similar opening, $c$, in the bottom $a$, as shown in Fig. 2. These openings $c\ d$ admit of the bees passing from the hive down into the feed-chamber, and this communication may be stopped at any time by means of a slide, C, which is fitted in the back part of the hive and directly over the bottom $a$, and is allowed a certain degree of lateral play or movement, by which it may be shoved over or off from the opening $d$. In the back of the feed-chamber there is made a hole, $e$, in which a tube, $f$, is inserted. In the feed-chamber there is placed a float or false bottom, D, formed of slats $g$, attached to battens or cross-pieces $h\ h$. This false bottom D floats on the liquid placed in the feed-chamber, and admits of the bees obtaining the same without danger of becoming wet. This liquid may be water for drink or it may be a saccharine fluid for food. The hole and tube $f$ serve to admit robbers into the feed-chambers and prevents them from returning. They are consequently entrapped and may be destroyed any time. The top of the feed-chamber is provided with a lid, $i$, and a glass, $j$. At the front part of the lower end of the hive there is an opening, $k$, which extends the whole width of the hive and serves as a bee-entrance; and D is a slide, the ends of which are fitted between vertical guides $l\ l$, one at each side of the front of the hive. This slide D has a hook, $m$, attached to it, which may be fitted in any of a series of holes, $n$, in the front of the hive, for the purpose of adjusting the slide higher or lower and increasing or diminishing the capacity of the bee-entrance as occasion may require. This will be fully understood by referring to Fig. 2. The hive A is provided with legs $a$, on which cups or reservoirs E are fitted. These cups or reservoirs may be filled with gum-camphor or any other substance which ants or like insects have an aversion to, and said insects will in consequence be prevented from gaining access to the hive. The bottom $a$ projects sufficiently far in front of the hive to form an alighting-board for the bees, as shown in Fig. 2, and said bottom $a$ may be readily removed when necessary by withdrawing the pins $b\ b$.

Having thus described my invention, what I claim as new, and desire to secure by Letters Patent, is—

Having the entrance-slide provided with hooks $m$, in combination with notches $n$ in the hive-front, so as to regulate the size of the entrance aperture, as herein shown and described.

HORACE MARKHAM.

Witnesses:
U. W. WOOD,
W. S. WOOD.